(12) United States Patent
He et al.

(10) Patent No.: US 10,027,781 B2
(45) Date of Patent: Jul. 17, 2018

(54) TCP LINK CONFIGURATION METHOD, APPARATUS, AND DEVICE

(71) Applicant: Huawei Technologies Co., Ltd., Shenzhen, Guangdong (CN)

(72) Inventors: Xianjun He, Shenzhen (CN); John Waclawsky, Santa Clara, CA (US); Zechao Meng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 14/983,891

(22) Filed: Dec. 30, 2015

(65) Prior Publication Data

US 2016/0112545 A1    Apr. 21, 2016

Related U.S. Application Data

(63) Continuation of application No. PCT/CN2013/090737, filed on Dec. 27, 2013.

(51) Int. Cl.
*H04L 29/06* (2006.01)
*H04L 12/24* (2006.01)
*H04L 12/801* (2013.01)

(52) U.S. Cl.
CPC ........... *H04L 69/163* (2013.01); *H04L 29/06* (2013.01); *H04L 41/0843* (2013.01);
(Continued)

(58) Field of Classification Search
CPC ............. H04L 43/0864; H04L 43/087; H04L 43/0876; H04L 45/70; H04L 43/0847;
(Continued)

(56) References Cited

U.S. PATENT DOCUMENTS 6,657,999 B1   12/2003   Brewer
9,288,128 B1*   3/2016   Palacios .............. H04L 43/0858
(Continued)

FOREIGN PATENT DOCUMENTS

| CN | 1773504 A | 5/2006 |
| CN | 101527968 A | 9/2009 |
| CN | 101808009 A | 8/2010 |

OTHER PUBLICATIONS

Soohong Park, et al., "RTSP-Based Adaptive Sending Control for IPTV Service in Heterogeneous Networks and Experimental Implementation", IEICE Trans. Commun., vol. E96B, No. 3, Mar. 1, 2013, p. 905-909.

(Continued)

*Primary Examiner* — Kwang B Yao
*Assistant Examiner* — Hardikkumar Patel

(57) ABSTRACT

Embodiments of the present invention disclose a TCP link configuration method, apparatus, and device. The method includes: acquiring data information in a data packet transmitted on a target TCP link or transmission information generated in a process of transmitting the data packet; determining, according to the data information or the transmission information, a target network type of a network on which the target TCP link is located; searching a pre-established configuration library for a target TCP configuration file corresponding to the target network type; and configuring the target TCP link by using the searched target TCP configuration file. According to the method, the configured target TCP link is better adapted to a network on which the target TCP link is located; use of network bandwidth can be maximized; and TCP transmission efficiency can be improved.

17 Claims, 13 Drawing Sheets

(52) U.S. Cl.
CPC ............ *H04L 41/12* (2013.01); *H04L 47/127* (2013.01); *H04L 69/161* (2013.01)

(58) Field of Classification Search
CPC ............. H04L 43/0852; H04L 43/0858; H04L 43/0888; H04L 69/163; H04L 29/06; H04L 41/0843; H04L 41/12; H04L 47/127; H04L 69/161
See application file for complete search history.

(56) References Cited

U.S. PATENT DOCUMENTS

| | | | |
|---|---|---|---|
| 2002/0089930 A1* | 7/2002 | Aceves | H04L 1/1832 370/230 |
| 2003/0031172 A1* | 2/2003 | Grinfeld | G06Q 40/04 370/389 |
| 2004/0255008 A1* | 12/2004 | Olsen | G06F 1/3209 709/220 |
| 2006/0095547 A1 | 5/2006 | Cohn | |
| 2008/0181213 A1* | 7/2008 | Ovsiannikov | H04L 63/0281 370/389 |
| 2010/0172343 A1* | 7/2010 | Crinon | H04M 3/2227 370/352 |
| 2010/0205300 A1* | 8/2010 | Uchida | G06F 21/6218 709/224 |
| 2011/0213820 A1* | 9/2011 | Morris | H04L 69/16 709/201 |
| 2012/0163167 A1* | 6/2012 | Dade | H04L 47/40 370/229 |
| 2012/0324065 A1 | 12/2012 | Yang | |
| 2014/0281018 A1* | 9/2014 | Waclawsky | H04L 47/193 709/235 |
| 2015/0071271 A1* | 3/2015 | Smedman | H04W 48/18 370/338 |

OTHER PUBLICATIONS

Eleni Patouni, et al., "Protocol Reconfiguration Schemes for Policy-based Equipment Management", 2006 IEEE 64th Vehicular Technology Conference, Sep. 1, 2006, 5 pages.

* cited by examiner

| Configuration file ID | Current usage count | Historical usage count | Congestion control algorithm | Initialization window | Size of receiving and sending buffer | SACK switch | Half-decay rate | ... |
|---|---|---|---|---|---|---|---|---|
| Local area network | XX | XX | Cubic | 100 | 64k/64k | Off | On | ... |

FIG. 1c

| Configuration file ID | Current usage count | Historical usage count | Congestion control algorithm | Initialization window | The size of receiving and sending buffer | SACK switch | Half-decay rate | ... |
|---|---|---|---|---|---|---|---|---|
| Wireless network | XX | XX | WestWood+ | 10 | 8k/8k | Off | On | ... |

FIG. 1d

TCP LINK CONFIGURATION METHOD, APPARATUS, AND DEVICE

CROSS-REFERENCE TO RELATED APPLICATIONS

This application is a continuation of International Application No. PCT/CN2013/090737, filed on Dec. 27, 2013, which is incorporated herein by reference in its entirety.

TECHNICAL FIELD

The present invention relates to the field of network technologies, and in particular, to a TCP link configuration method, apparatus, and device.

BACKGROUND

The TCP (Transmission Control Protocol, Transmission Control Protocol) is a most widely-used transport layer protocol on the Internet. The TCP may resolve problems such as fairness, utilization efficiency, and congestion control of bandwidth sharing among data streams on the Internet, so as to provide reliable and robust (robust) end-to-end communication for the Internet.

Congestion control is a core function of the TCP protocol. Communications channels and buffer storage space of an Internet-based switch are generally resources shared by all hosts on a network and are also a potential bottleneck of a network system. As the number of hosts and the number of services continuously increase, competition for a resource may occur, thereby causing congestion on a network. Executing a set of algorithms for congestion control and congestion restoration is an important part of the TCP. A purpose of a TCP congestion control algorithm is to maximize use of network bandwidth and control a congestion phenomenon not to occur in a data transmission process.

An IETF (Internet Engineering Task Force, Internet Engineering Task Force) congestion control standard has proposed some universal algorithms. However, in a specific application, there are many problems because of a complex and changeable network environment. At present, although many improved TCP congestion control algorithms (such as: FastTcp/Westwood+/NewReno) and parameters (such as: SACK/FACK/Limited Transmit) have been proposed for these problems, each congestion control algorithm is designed only for a specific network environment; therefore, after the network environment changes, a previously configured congestion control algorithm and parameters may not be applicable to the new network environment, which causes a low utilization rate of network bandwidth and low TCP transmission efficiency.

SUMMARY

The present invention provides a TCP link configuration method, apparatus, and device to improve efficiency in TCP transmission.

To achieve the foregoing objective, the present invention provides the following technical solutions:

According to one aspect, the present invention discloses a Transmission Control Protocol (TCP) link configuration method, including: acquiring data information in a data packet transmitted on a target TCP link or transmission information generated in a process of transmitting the data packet; determining, according to the data information or the transmission information, a target network type of a network on which the target TCP link is located; searching a pre-established configuration library for a target TCP configuration file corresponding to the target network type, where the configuration library includes a correspondence between a network type and a TCP configuration file, and each network type corresponds to one TCP configuration file; and configuring the target TCP link by using the searched target TCP configuration file.

With reference to the first aspect, in a first possible implementation manner of the first aspect, the data information includes a destination IP address and a source IP address that are carried in the data packet transmitted on the target TCP link; and the determining, according to the data information, a target network type of a network on which the target TCP link is located includes: determining whether the destination IP address or the source IP address is an IP address of a server that runs a TCP service; determining that the target network type is a local area network when the destination IP address is the IP address of the server that runs the TCP service; or determining that the target network type is a wide area network when the source IP address is the IP address of the server that runs the TCP service.

With reference to the first aspect, in a second possible implementation manner of the first aspect, the transmission information includes a round-trip transmission time for transmitting the data packet on the target TCP link; and the determining, according to the transmission information, a target network type corresponding to the target TCP link includes: determining whether the round-trip transmission time is less than a first preset length of time; determining that the target network type is a local area network when the round-trip transmission time is less than the first preset length of time; or determining that the target network type is a wide area network when the round-trip transmission time is greater than or equal to the first preset length of time.

With reference to the first aspect, in a third possible implementation manner of the first aspect, the determining, according to the data information or a transmission information, a target network type of a network on which the target TCP link is located includes: determining, according to the data information or the transmission information, an initial network type of the network on which the target TCP link is located; searching the configuration library for an initial TCP configuration file corresponding to the initial network type; performing initial configuration on the target TCP link by using the initial TCP configuration file; acquiring second transmission information generated in a process of transmitting the data packet on the initially configured target TCP link; and determining, according to the second transmission information, the target network type of the network on which the target TCP link is located.

With reference to the third possible implementation manner of the first aspect, in a fourth possible implementation manner of the first aspect, the second transmission information includes: throughput, a variation in the round-trip transmission time, a latency peak value, a maximum round-trip transmission time, a quantity of lost data packets, and/or a retransmission rate; and the determining, according to the second transmission information, the target network type of the network on which the target TCP link is located includes: determining that the target network type is a wireless network when the throughput is less than a first preset throughput, there is no variation in the round-trip transmission time before congestion occurs, no latency peak value is detected, and the round-trip transmission time is not less than a second preset length of time; or determining that the target network type is a wireless network when the throughput is less than a second preset throughput, the maximum round-trip transmission time is less than a third preset length of time, loss of multiple data packets has not occurred within a round-trip transmission time, and the retransmission rate is less than a preset retransmission rate.

With reference to the third possible implementation manner or the fourth possible implementation manner of the first aspect, in a fifth possible implementation manner of the first aspect, after the acquiring second transmission information generated in a process of transmitting the data packet on the initially configured target TCP link, the method further includes: acquiring a connection type of the initially configured target TCP link; determining whether the connection type is an http short connection; and/or, determining whether the number of data packets transmitted on the initially configured target TCP link after congestion occurs is less than a preset number; and/or, determining whether a transmission rate of the data packet transmitted on the initially configured target TCP link after congestion occurs is less than a preset transmission rate; and/or, determining whether the connection type is along connection and whether the number of times congestion occurs on the target TCP link is less than a preset value; and performing the step of determining, according to the second transmission information, the target network type of the network on which the target TCP link is located when the connection type is a http short connection, or the number of data packets transmitted after congestion occurs is less than the preset number, or the transmission rate is less than the preset transmission rate, or the connection type is the long connection and the number of times congestion occurs is less than the preset value.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the method further includes: determining whether a first packet in a four-way handshake phase that is used for terminating the target TCP link is received; acquiring attribute information of the target TCP link when the first packet in the four-way handshake phase that is used for terminating the target TCP link is received, where the attribute information includes an access port or an IP address; and establishing a correspondence between the attribute information and the searched target TCP configuration file, and storing the correspondence between the attribute information and the searched target TCP configuration file in the configuration library.

With reference to the sixth possible implementation manner of the first aspect, in a seventh possible implementation manner of the first aspect, the method further includes: determining whether three packets in a three-way handshake phase that is used for establishing the target TCP link are received; acquiring attribute information that is of the target TCP link and carried in the three packets when the three packets in the three-way handshake phase that is used for establishing the target TCP link are received; searching the configuration library for whether a TCP configuration file corresponding to the attribute information exists; and configuring the target TCP link by using the found TCP configuration file when the TCP configuration file corresponding to the attribute information exists.

According to a second aspect, the present invention discloses a Transmission Control Protocol (TCP) link configuration apparatus, where the apparatus is applied to a communications network and a user terminal and a server are respectively disposed on two sides of the communications network; a TCP link is established between the user terminal and the server by using the communications network; and the apparatus is disposed in a network device of the communications network or disposed in the server and is configured to configure the TCP link; and the apparatus includes: an information acquiring unit, configured to acquire data information in a data packet transmitted on a target TCP link or transmission information generated in a process of transmitting the data packet; a target network type determining unit, configured to determine, according to the data information or the transmission information, a target network type of a network on which the target TCP link is located; a target TCP configuration file determining unit, configured to search a pre-established configuration library for a target TCP configuration file corresponding to the target network type, where the configuration library includes a correspondence between a network type and a TCP configuration file, and each network type corresponds to one TCP configuration file; and a configuring unit, configured to configure the target TCP link by using the searched target TCP configuration file.

With reference to the second aspect, in a first possible implementation manner of the second aspect, the data information includes a destination IP address and a source IP address that are carried in the data packet transmitted on the target TCP link; and the target network type determining unit includes: a first judging unit, configured to determine whether the destination IP address or the source IP address is an IP address of a server that runs a TCP service; and a first determining unit, configured to determine that the target network type is a local area network when the destination IP address is the IP address of the server that runs the TCP service or determine that the target network type is a wide area network when the source IP address is the IP address of the server that runs the TCP service.

With reference to the second aspect, in a second possible implementation manner of the second aspect, the transmission info/nation includes a round-trip transmission time for transmitting the data packet on the target TCP link; and the target network type determining unit includes: a round-trip transmission time judging unit, configured to determine whether the round-trip transmission time is less than a first preset length of time; and a second determining unit, configured to determine that the target network type is a local area network when the round-trip transmission time is less than the first preset length of time or determine that the target network type is a wide area network when the round-trip transmission time is greater than or equal to the first preset length of time.

With reference to the second aspect, in a third possible implementation manner of the second aspect, the target network type determining unit includes: an initial network type determining unit, configured to determine, according to the data information or the transmission information, an initial network type of a network on which the target TCP link is located; an initial TCP configuration file determining unit, configured to search the configuration library for an initial TCP configuration file corresponding to the initial network type; an initial configuration unit, configured to perform initial configuration on the target TCP link by using the initial TCP configuration file; a second transmission information acquiring unit, configured to acquire second transmission information generated in a process of transmitting the data packet on the initially configured target TCP link; and a target network type determining subunit, configured to determine, according to the second transmission information, the target network type of the network on which the target TCP link is located.

With reference to the third possible implementation manner of the second aspect, in a fourth possible implementation manner of the second aspect, the second transmission information includes: throughput, a variation in the round-trip transmission time, a latency peak value, a maximum round-trip transmission time, a quantity of lost data packets, and/or a retransmission rate; and the target network type determining subunit includes: a third determining unit, configured to: determine that the target network type is a wireless network when the throughput is less than a first preset throughput, there is no variation in the round-trip transmission time before congestion occurs, no latency peak value is detected, and the round-trip transmission time is not less than a second preset length of time; or determine that the target network type is a wireless network when the throughput is less than a second preset throughput, the maximum round-trip transmission time is less than a third preset length of time, loss of multiple data packets has not occurred within a round-trip transmission time, and the retransmission rate is less than a preset retransmission rate.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner of the second aspect, the apparatus further includes: a connection type acquiring unit, configured to acquire a connection type of the initially configured target TCP link; and a second judging unit, configured to: determine whether the connection type is an http short connection; and/or, determine whether the number of data packets transmitted on the initially configured target TCP link after congestion occurs is less than a preset number; and/or, determine whether a transmission rate of the data packet transmitted on the initially configured target TCP link after congestion occurs is less than a preset transmission rate; and/or, determine whether the connection type is a long connection and whether the number of times congestion occurs on the target TCP link is less than a preset value; where the target network type determining subunit performs an operation when the connection type is an http short connection, or the number of data packets transmitted after congestion occurs is less than the preset number, or the transmission rate is less than the preset transmission rate, or the connection type is a long connection and the number of times congestion occurs is less than the preset value.

With reference to the fifth possible implementation manner of the second aspect, in a sixth possible implementation manner of the second aspect, the apparatus further includes: a link termination packet detecting unit, configured to determine whether a first packet in a four-way handshake phase that is used for terminating the target TCP link is received; a first attribute information acquiring unit, configured to acquire attribute information of the target TCP link when the first packet in the four-way handshake phase that is used for terminating the target TCP link is received, where the attribute information includes an access port or an IP address; and a storing unit, configured to establish a correspondence between the attribute information and the searched target TCP configuration file, and store the correspondence between the attribute information and the searched target TCP configuration file in the configuration library.

With reference to the sixth possible implementation manner of the second aspect, in a seventh possible implementation manner of the second aspect, the apparatus further includes: a link establishment packet detecting unit, configured to determine whether three packets in a three-way handshake phase that is used for establishing the target TCP link are received; a second attribute information acquiring unit, configured to acquire attribute information that is of the target TCP link and carried in the three packets when the three packets in the three-way handshake phase that is used for establishing the target TCP link are received; a searching unit, configured to search the configuration library for whether a TCP configuration file corresponding to the attribute information exists; and a second configuring unit, configured to configure the target TCP link by using the found TCP configuration file when the TCP configuration file corresponding to the attribute information exists.

According to a third aspect, the present invention discloses a Transmission Control Protocol TCP link control device, including a TCP link configuration apparatus according to the foregoing second aspect or any one possible implementation manner of the second aspect.

It may be learned from the foregoing technical solutions that, according to the method and the apparatus of the present invention, by detecting data information in a data packet transmitted on a target TCP link or transmission information generated in a process of transmitting the data packet, a target network type corresponding to the target TCP link can be determined; further, a pre-established configuration library may be searched for a target TCP configuration file corresponding to the target network type can be found; and finally, the target TCP link is configured by using the searched target TCP configuration file. Therefore, according to this method, a matched TCP configuration file can be found, configuration can be performed according to a condition of data packet transmission on the target TCP link, so that the configured target TCP link is better adapted to the type of network on which the target TCP link is located, use of network bandwidth can be maximized, and TCP transmission efficiency is improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1c is a schematic diagram of a template of a TCP link configuration file according to an embodiment of the present invention;

FIG. 1d is a schematic diagram of another template of a TCP link configuration file according to an embodiment of the present invention;

DETAILED DESCRIPTION

In order to enable a person skilled in the art to better understand technical solutions in the embodiments of the present invention and make the foregoing objectives, features, and advantages of the embodiments of the present invention more comprehensible, the technical solutions in the embodiments of the present invention are further described in detail below with reference to the accompanying drawings.

Figure 1A:
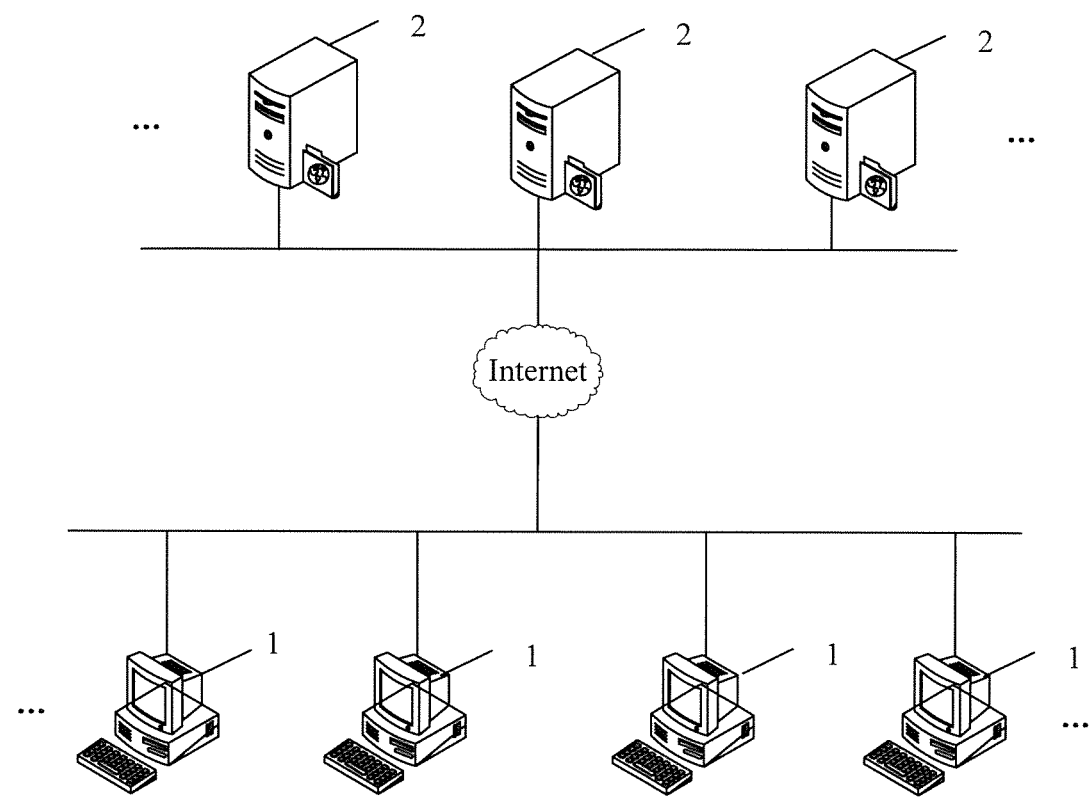
FIG. 1a is a network topology diagram applied in a TCP link configuration method according to an embodiment of this application.

FIG. 1a is a network topology diagram applied in a TCP link configuration method according to an embodiment of this application. As shown in FIG. 1a, in the diagram, 1 is a user terminal; 2 is a server; multiple servers 2 form a server cluster; the user terminal 1 is connected to the server cluster 2 by using the Internet, where the Internet may be a common wide area network or a local area network, and the wide area network includes a wired transmission network and a wireless transmission network. The TCP link configuration apparatus provided in this embodiment of this application is configured to configure a TCP link that is established between a user terminal and a server, so as to provide a congestion control algorithm and a parameter that serve a network environment in which the user terminal is located. Optionally, the TCP link configuration apparatus may be located on a network device, such as a router, a switch, a modem, or a communications server. In addition, in another embodiment, the TCP link configuration apparatus may further be located on a server cluster which is formed by one server or multiple servers.

Figure 1B:
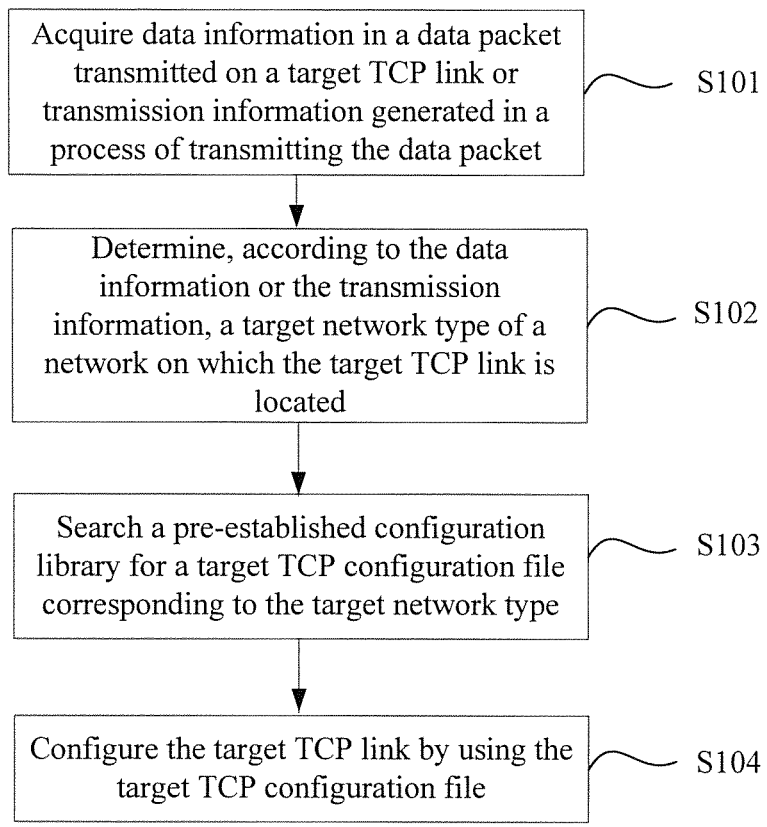
FIG. 1b is a schematic flowchart of a TCP link configuration method according to an embodiment of the present invention.

FIG. 1b is a schematic flowchart of a TCP link configuration method according to an embodiment of the present invention. As shown in FIG. 1b, the method may include the following steps:

S101. Acquire data information in a data packet transmitted on a target TCP link or transmission information generated in a process of transmitting the data packet.

The data information and the transmission information are a basis for determining a network type of the target TCP link. In this embodiment of the present invention, the data information may include a destination IP address, a source IP address, or the like that is carried in the data packet transmitted on the target TCP link; and the transmission information refers to some network parameters of the data packet transmitted on the target TCP link, such as throughput, a variation in a round-trip transmission time, a latency peak value, a maximum round-trip transmission time, a quantity of lost data packets, and/or a retransmission rate.

S102. Determine, according to the data information or the transmission information, a target network type of a network on which the target TCP link is located.

The data information or the transmission information may reflect an actual condition when data is transmitted on the target TCP link. A network type of the network on which the target TCP link is located may be determined by using the data information or the transmission information, so as to determine the target network type of the network on which the target TCP link is located.

For example, when the destination IP address is an IP address of a server that runs a TCP service, it can be determined that the target network type of the target TCP link is a local area network; or when the round-trip transmission time is greater than or equal to a first preset length of time, where the first preset length of time may be 30 ms, it can be determined that the target network type is a wide area network.

S103. Search a pre-established configuration library for a target TCP configuration file corresponding to the target network type.

In this embodiment of the present invention, by using experiments or theoretical analysis of multiple times, TCP configuration files of different network types may be acquired in advance. For one network type, there may be one or more TCP configuration files. However, a default TCP configuration file may be established for each network type; and a configuration library that includes a correspondence between a network type and a default TCP configuration file may be established in advance, so that after a target network type is acquired, the configuration library may be searched for a default TCP configuration file corresponding to the target network type. After the default TCP configuration file is found, the default TCP configuration file found is used as the searched target TCP configuration file.

The TCP configuration file includes a congestion control algorithm and an optimized parameter template that match a corresponding network type. As shown in FIG. 1c and FIG. 1d, which are schematic diagrams of two templates of a TCP configuration file provided in this embodiment of the present invention. In the diagrams, SACK is Selective Acknowledgment, of which the Chinese translation is "selective acknowledgement". The templates shown in FIG. 1c and FIG. 1d are only an instance of the present invention. Optionally, in other embodiments of the present invention, a person skilled in the art may add content to or delete content from a configuration file in the template of the TCP configuration file according to requirements.

S104. Configure the target TCP link by using the searched target TCP configuration file.

It may be learned from the foregoing technical solutions that, according to the method provided in this embodiment of the present invention, by detecting data information in a data packet transmitted on a target TCP link or transmission information generated in a process of transmitting the data packet, a target network type of a network on which the target TCP link is located can be determined; further, a pre-established configuration library can be searched for a target TCP configuration file corresponding to the target network type; and the target TCP link is configured by using the searched target TCP configuration file. Therefore, according to this method, a matched TCP configuration file can be found and configuration can be performed according to a condition of data packet transmission on the target TCP link.

Compared with the prior art, according to this method, a target TCP configuration file that matches the target TCP link can be automatically selected, so that the configured target TCP link is better adapted to a network type to which the target TCP link belongs, use of network bandwidth can be maximized, and TCP transmission efficiency is improved.

The following uses an ADC (Application Delivery Controller, application delivery controller) server as an example for description. In an ADC scenario, an ADC device is deployed on a front end of a server cluster. The server cluster is on a LAN side; a user is on a WAN side. The ADC device distributes user requests to servers of different clusters according to different request content of the user.

Figure 2:
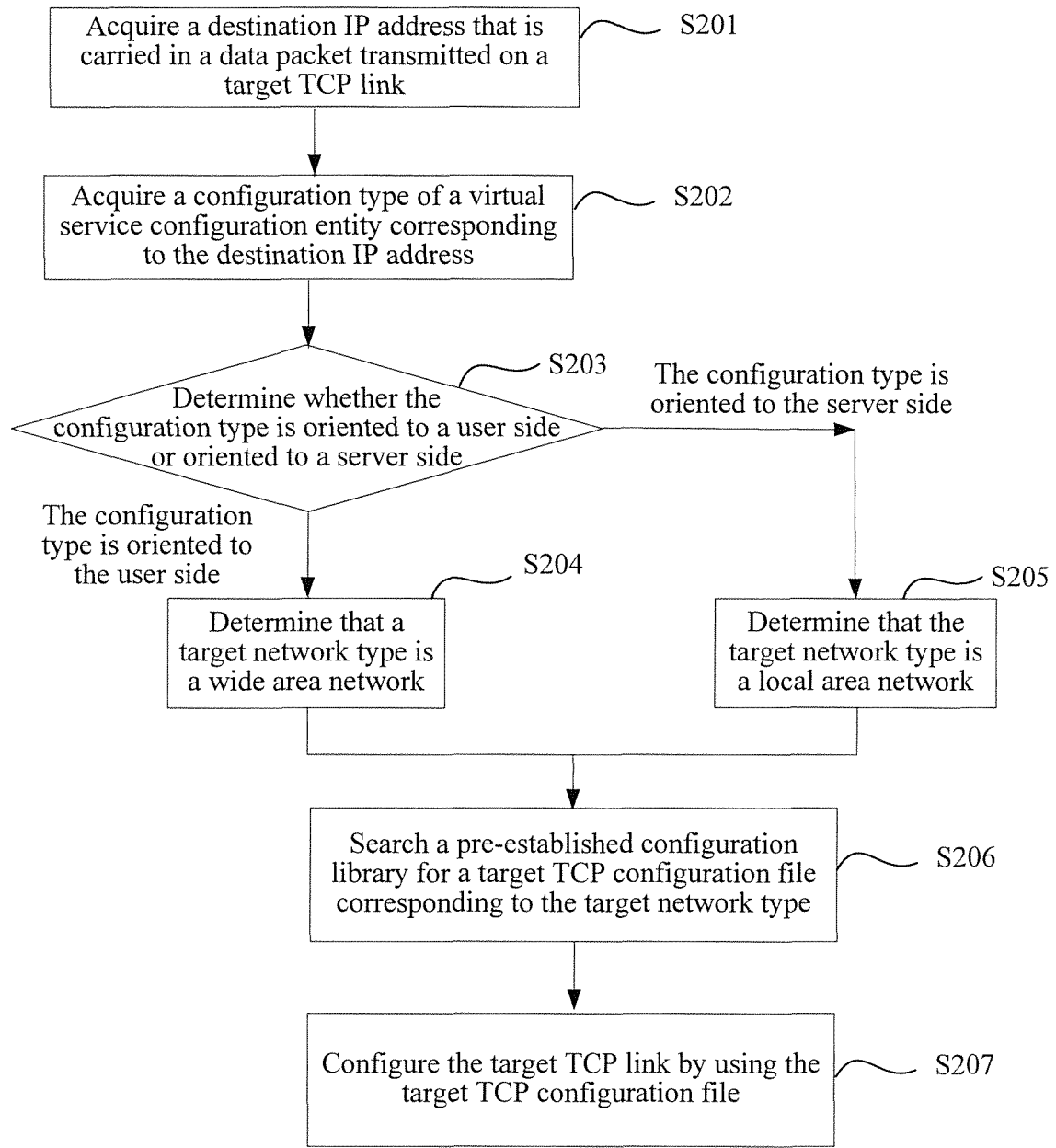
FIG. 2 is a schematic flowchart of a TCP link configuration method according to another embodiment of the present invention.

FIG. 2 is a schematic flowchart of a TCP link configuration method according to another embodiment of the present invention. As shown in FIG. 2, the method may include the following steps:

S201. Acquire a destination IP address that is carried in a data packet transmitted on a target TCP link.

S202. Acquire a configuration type of a virtual service configuration entity corresponding to the destination IP address, where the configuration type includes a user-oriented side and a server-oriented side.

In the ADC scenario, when the ADC device provides a service to the outside, there is a VS (Virtual Server, virtual service) configuration entity that is configured to provide a service IP address to the outside. The VS configuration entity is generally used in two configuration types, where one is a configuration type that is oriented to a user side and is used for providing a service to an Internet user, and the other one is a configuration type that is oriented to a service side and is used for distributing a request to a real server cluster (servers that are located in a same local area network).

Therefore, when the destination IP address that is carried in the data packet transmitted on the target TCP link is acquired, a corresponding VS configuration entity can be found according to the destination IP address; and the configuration type of the virtual service configuration entity can further be determined.

S203. Determine whether the configuration type is oriented to the user side or oriented to the server side.

When a result of the determining is that the configuration type is oriented to the user side, perform step S204; when the result of the determining is that the configuration type is oriented to the server side, perform step S205.

S204. Determine that a target network type is a wide area network.

S205. Determine that a target network type is a local area network.

S206. Search a pre-established configuration library for a target TCP configuration file corresponding to the target network type.

S207. Configure the target TCP link by using the searched target TCP configuration file.

Figure 3:
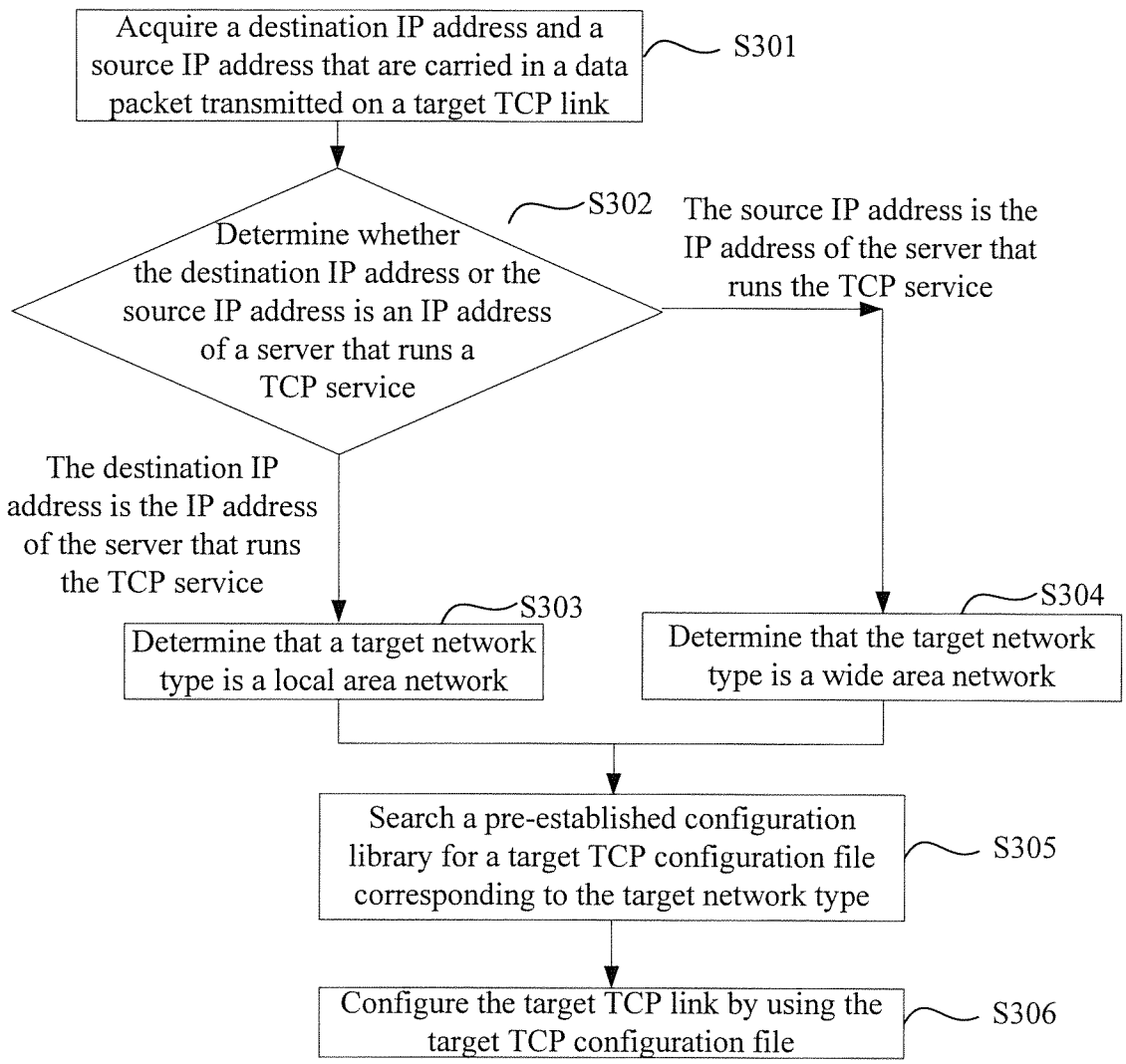
FIG. 3 is a schematic flowchart of a TCP link configuration method according to still another embodiment of the present invention.

FIG. 3 is a schematic flowchart of a TCP link configuration method according to still another embodiment of the present invention. As shown in FIG. 3, the method may include the following steps:

S301. Acquire a destination IP address and a source IP address that are carried in a data packet transmitted on a target TCP link.

S302. Determine whether the destination IP address or the source IP address is an IP address of a server that runs a TCP service.

When the destination IP address is the IP address of the server that runs the TCP service, perform step S303; when the source IP address is the IP address of the server that runs the TCP service, perform step S304.

S303. Determine that a target network type is a local area network.

The destination IP address is the IP address of the server that runs the TCP service. In this case, data transmitted on the TCP link is an uplink stream.

S304. Determine that a target network type is a wide area network.

The source IP address is the IP address of the server that runs the TCP service. In this case, data transmitted on the TCP link is a downlink stream.

S305. Search a pre-established configuration library for a target TCP configuration file corresponding to the target network type.

S306. Configure the target TCP link by using the searched target TCP configuration file.

Figure 4:
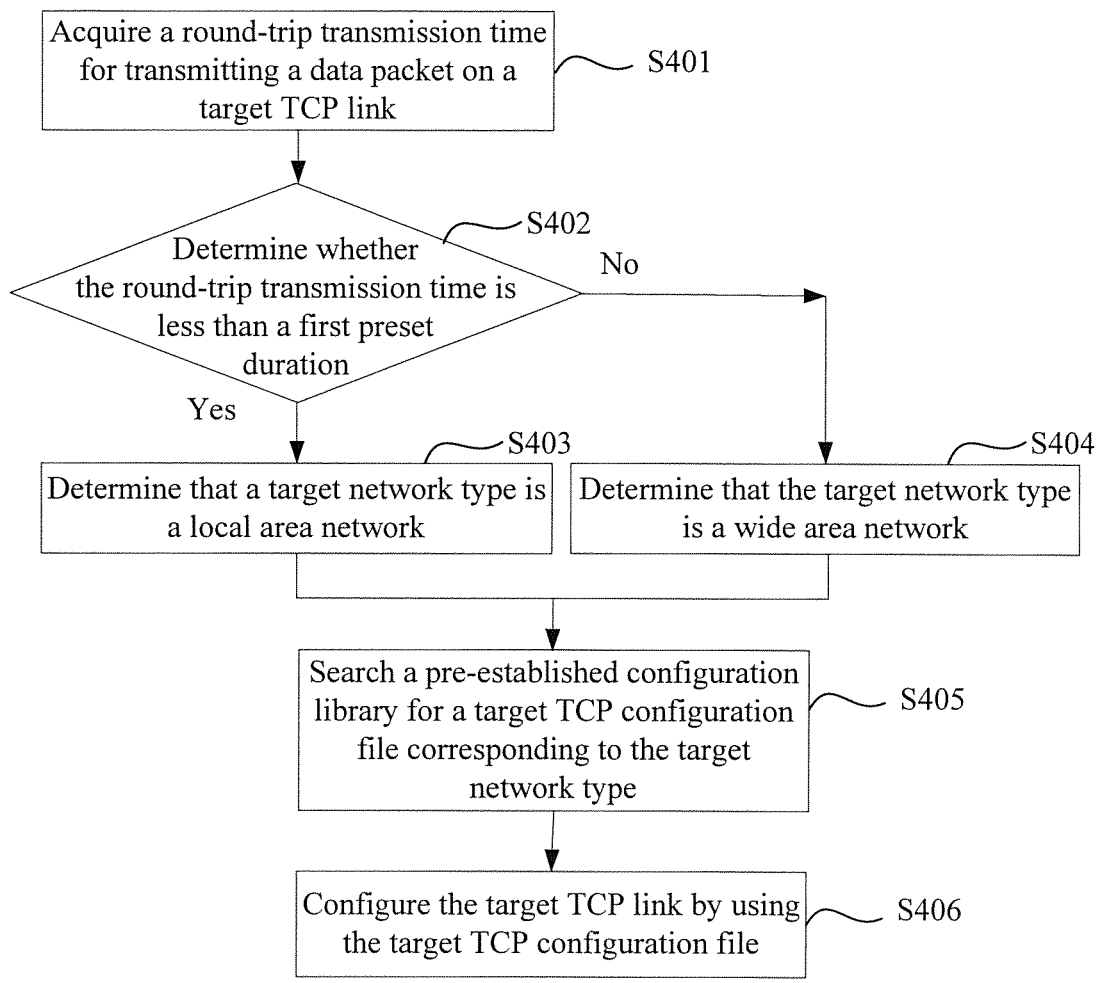
FIG. 4 is a schematic flowchart of a TCP link configuration method according to yet another embodiment of the present invention.

FIG. 4 is a schematic flowchart of a TCP link configuration method according to yet another embodiment of the present invention. As shown in FIG. 4, the method may include the following steps:

S401. Acquire a round-trip transmission time for transmitting a data packet on a target TCP link.

S402. Determine whether the round-trip transmission time is less than a first preset length of time.

In this embodiment of the present invention, the first preset length of time may be 30 ms.

When the round-trip transmission time is less than the first preset length of time, step S403 is performed; otherwise, step S404 is performed.

S403. Determine that a target network type is a local area network.

S404. Determine that a target network type is a wide area network.

S405. Search a pre-established configuration library for a target TCP configuration file corresponding to the target network type.

S406. Configure the target TCP link by using the searched target TCP configuration file.

Figure 5A:
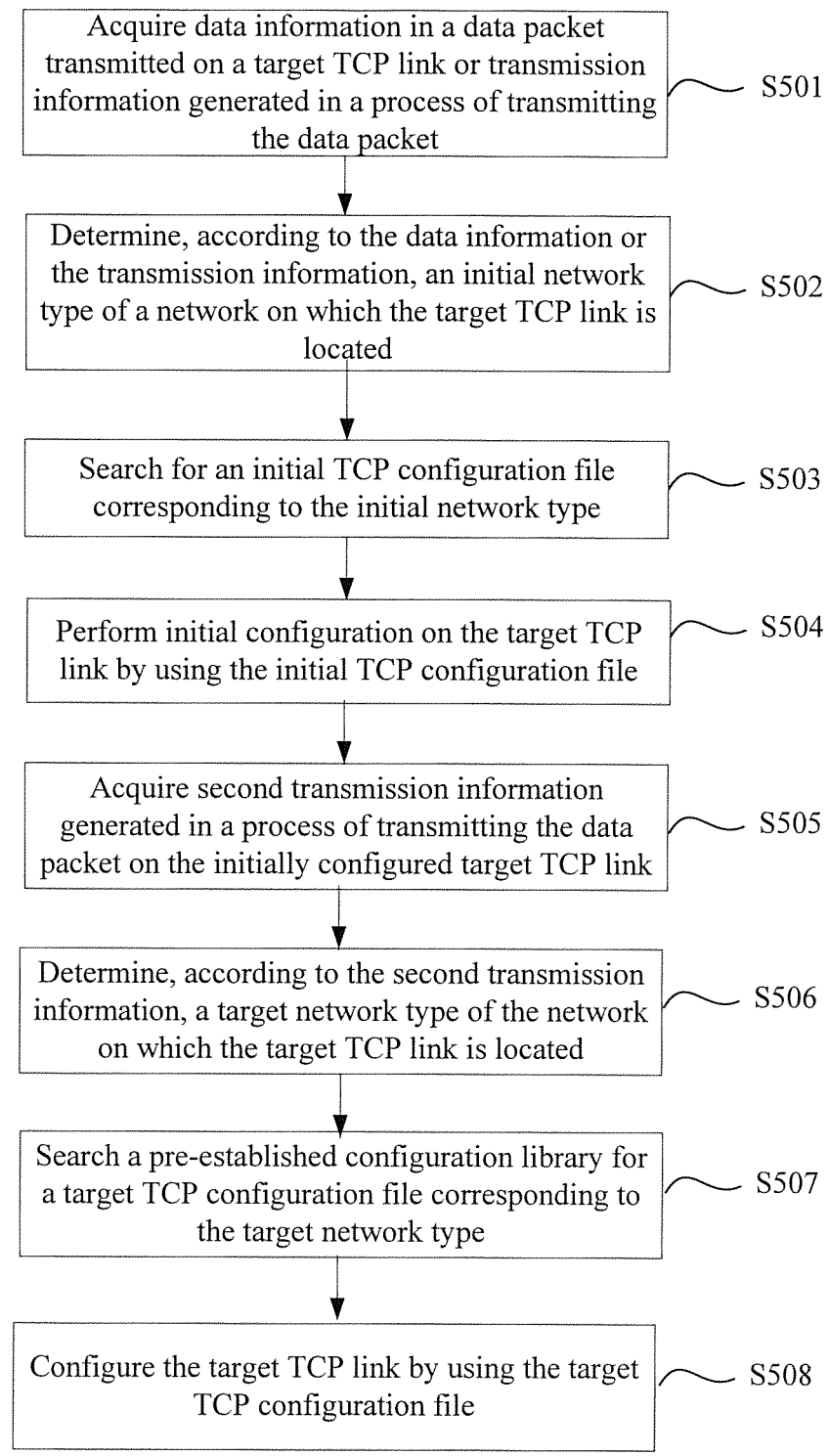
FIG. 5a is a schematic flowchart of a TCP link configuration method according to yet another embodiment of the present invention.

FIG. 5a is a schematic flowchart of a TCP link configuration method according to yet another embodiment of the present invention. As shown in FIG. 5a, the method may include the following steps:

S501: Acquire data information in a data packet transmitted on a target TCP link or transmission information generated in a process of transmitting the data packet.

S502. Determine, according to the data information or the transmission information, an initial network type of a network on which the target TCP link is located.

The initial network type herein includes a target network type, which specifically means that a network environment corresponding to the target network type belongs to a network environment corresponding to the initial network type. For example, a wide area network may include a wireless network; then, the initial network type may be the wide area network, and the target network type may be the wireless network.

S503. Search for an initial TCP configuration file corresponding to the initial network type.

For a process of searching for the initial TCP configuration file, reference may be made to a process of searching for a target TCP configuration file in the foregoing step S103.

S504: Perform initial configuration on the target TCP link by using the initial TCP configuration file.

In the embodiments shown in the foregoing FIG. 1b to FIG. 4, after the target network type is determined by using the data information or the transmission information and the target network type is configured, in this case, the determined target TCP configuration file may not be an optimal matching result of the target TCP link. For example, a data packet transmitted on a target TCP link that is newly established can not reflect a real transmission condition; or after a network environment changes after configuration, a configuration file needed for the configured target TCP link changes. Therefore, in this embodiment of the present invention, the network type determined according to the data information or the transmission information is used as the initial network type; and a TCP configuration file corresponding to the initial network type is used as the initial TCP configuration file, so as to implement initial configuration on the target TCP link.

S505. Acquire second transmission information generated in a process of transmitting the data packet on the initially configured target TCP link.

S506. Determine, according to the second transmission information, a target network type of the network on which the target TCP link is located.

In this embodiment of the present invention, the second transmission information includes: throughput of data packets transmitted on the initially configured target TCP link, a variation in a round-trip transmission time, a latency peak value, a maximum round-trip transmission time, a quantity of lost data packets, and/or a retransmission rate, and the like.

When the second transmission information includes the throughput, the variation in the round-trip transmission time, the latency peak value and the maximum round-trip transmission time, step S506 may include the following steps:

(01) Determine whether the throughput is less than a first preset throughput.

(02) Determine whether there is a variation in the round-trip transmission time before congestion occurs.

(03) Determine whether a latency peak value is detected.

(04) Determine whether the round-trip transmission time is less than a second preset length of time.

(05) Determine that the target network type is a wireless network when the throughput is less than the first preset throughput, there is no variation in the round-trip transmission time before congestion occurs, no latency peak value is detected, and the round-trip transmission time is not less than the second preset length of time.

In this embodiment of this application, the first preset throughput may be 20 Mbps; the second preset length of time may be 600 ms. In addition, the foregoing steps (01), (02), (03), and (04) may be sequentially performed according to a sequence of the numbers, or may also be performed randomly not according to the numbers.

In addition, when the second transmission information includes the throughput, the maximum round-trip transmission time, the quantity of lost data packets, and the retransmission rate, the step S506 may further include the following steps:

(11) Determine whether the throughput is less than a second preset throughput.

(12) Determine whether the maximum round-trip transmission time is less than a third preset length of time.

(13) Determine whether loss of multiple data packets has not occurred within a round-trip transmission time.

(14) Determine whether the retransmission rate is less than a preset retransmission rate.

(15) Determine that the target network type is a wireless network when the throughput is less than the second preset throughput, the maximum round-trip transmission time is less than the third preset length of time, the loss of multiple data packets has not occurred within a round-trip transmission time, and the retransmission rate is less than the preset retransmission rate.

In this embodiment of this application, the second preset throughput may also be 20 Mbps; the third preset length of time may also be 600 ms; and the preset retransmission rate may be 10%. In addition, the foregoing steps (11), (12), (13), and (14) may be performed sequentially according to a sequence of the numbers, or may also be performed randomly not according to the numbers.

S507. Search a pre-established configuration library for a target TCP configuration file corresponding to the target network type.

S508. Configure the target TCP link by using the searched target TCP configuration file.

It may be learned from the foregoing technical solutions that, according to the method provided in this embodiment of the present invention, when a target TCP link is being configured, an initial network type may be determined first by acquiring data information or transmission information of the data packet transmitted on the target TCP link; an initial TCP configuration file corresponding to the initial network type is searched for; the target TCP link is initially configured; the initially configured target TCP link performs data transmission; in this case, second transmission information generated in a process of transmitting the data packet on the initially configured target TCP link is then acquired; and the target network type of a network on which the target TCP link is located is precisely determined according to the second transmission information.

By means of determining in two steps, the finally determined target network type can be more accurate, so that the configured target TCP link is better adapted to a network type to which the target TCP link belongs, use of network bandwidth can be maximized, and TCP transmission efficiency is improved.

Figure 5B:
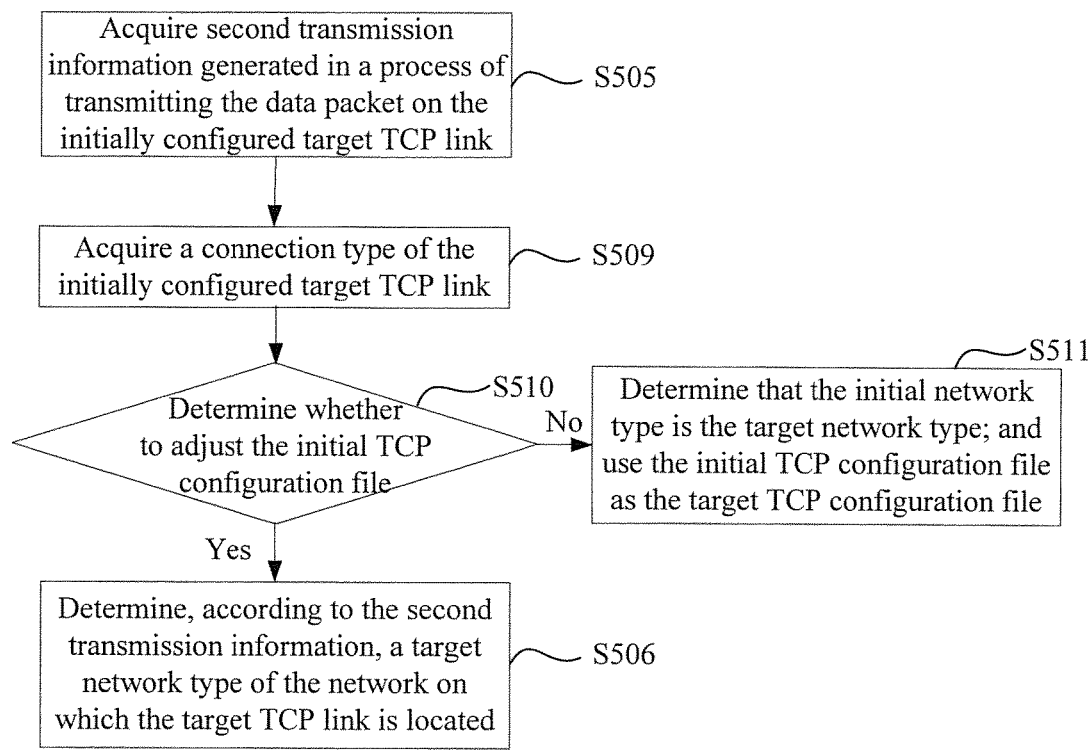
FIG. 5b is a schematic flowchart of a TCP link configuration method according to yet another embodiment of the present invention.

Based on FIG. 5a, referring to FIG. 5b, in this embodiment of the present invention, after step S505, the method may further include the following steps:

S509. Acquire a connection type of the initially configured target TCP link.

S510. Determine whether to adjust the initial TCP configuration file according to the connection type, and/or the second transmission information after the initial configuration.

Step S510 may include the following steps:

(21): Determine whether the connection type is an http short connection.

(22): Determine that the number of data packets transmitted on the initially configured target TCP link after congestion occurs is less than a preset number.

(23): Determine that a transmission rate of the data packet transmitted on the initially configured target TCP link after congestion occurs is less than a preset transmission rate.

(24): Determine whether the connection type is a long connection and that the number of times congestion occurs on the target TCP link is less than a preset value.

The foregoing multiple determining steps (21), (22), (23), and (24) may be sequentially performed, or may be performed according to other sequences. Optionally, in another embodiment of the present invention, any one or more of the foregoing steps may also be performed. When the connection type is an http short connection, or the number of data packets transmitted after congestion occurs is less than the preset number, or the transmission rate is less than the preset transmission rate, or the connection type is a long connection and the number of times congestion occurs is less than the preset value, perform (25); otherwise, it is determined that the selected initial TCP configuration file meets a requirement of the target TCP link and adjustment is not required.

(25): Determine to adjust the initial TCP configuration file.

S506 is performed only when it is determined to adjust the initial TCP configuration file.

However, when it is determined not to adjust the initial TCP configuration file, as shown in FIG. 5b, the method may further include the following step:

S511. Determine that the initial network type is the target network type; use the initial TCP configuration file as the searched target TCP configuration file; and perform S508.

A network type of the target TCP link can be accurately found by determining a network type once; in this case, an initial configuration result can be directly used without further adjusting a configuration condition of the target TCP link.

Figure 6:
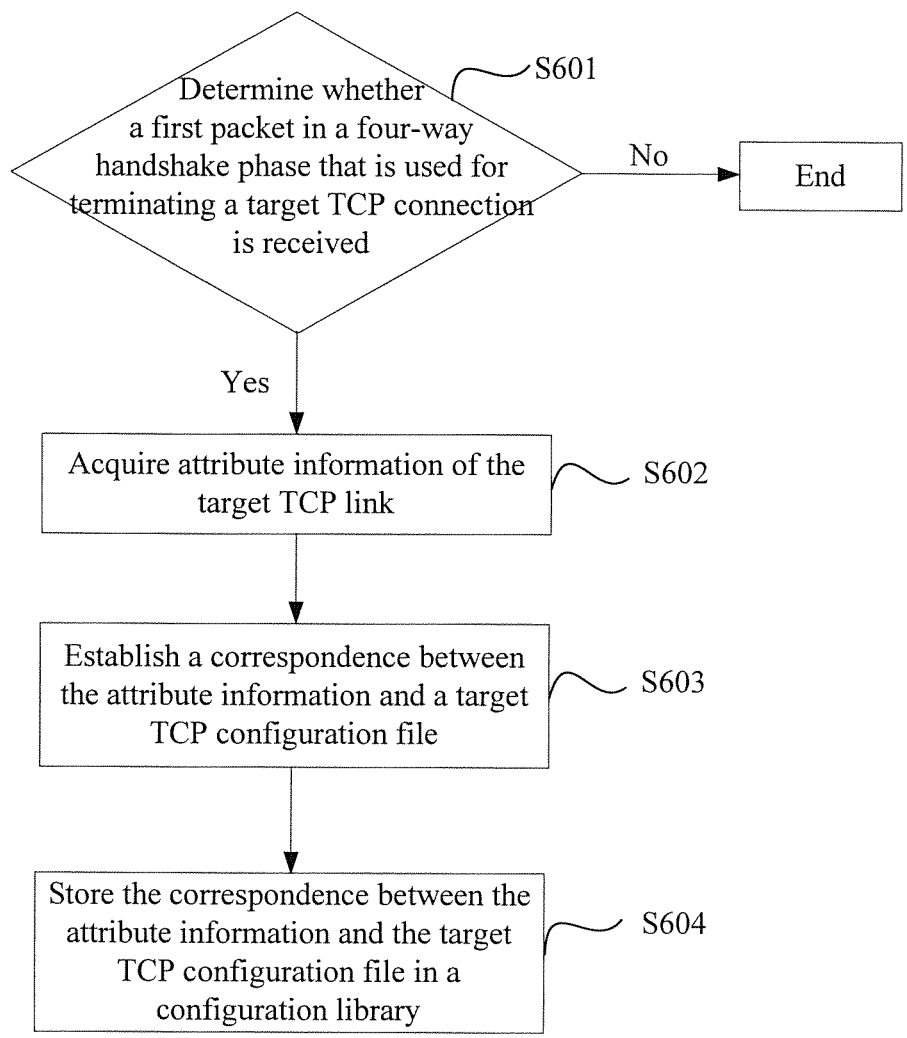
FIG. 6 is a schematic flowchart of a TCP link configuration method according to yet another embodiment of the present invention.

FIG. 6 is a schematic flowchart of a TCP link configuration method according to yet another embodiment of the present invention. Based on the embodiments shown in the foregoing FIG. 1b to FIG. 1d, FIG. 2, FIG. 3, FIG. 4, FIG. 5a, and FIG. 5b, after the target TCP link is configured by using the searched target TCP configuration file, as shown in FIG. 6, the method may further include the following steps:

S601. Determine whether a first packet in a four-way handshake phase that is used for terminating the target TCP link is received.

When the first packet is received, perform step S602; otherwise, the procedure ends.

S602. Acquire attribute information of the target TCP link.

Attribute information of a TCP link refers to information that is used to identify the TCP link. In this embodiment of the present invention, the attribute information includes access port information or IP address information, where the access port information refers to an access port value set in a user terminal, and the IP address information refers to an IP address of the user terminal. Optionally, in another embodiment of the present invention, the attribute information may further be an attribute field similar to Cookie information.

S603. Establish a correspondence between the attribute information and the searched target TCP configuration file.

S604. Store the correspondence between the attribute information and the searched target TCP configuration file in the configuration library.

In this embodiment of the present invention, by acquiring attribute information of a target TCP link, a correspondence between attribute information of the target TCP link and a target TCP configuration file may be stored in a configuration library each time after configuration is completed and when the target TCP link is in a link termination phase, so that when a TCP link that has the same attribute information is established again subsequently, a previously recorded target TCP configuration file may be directly used for configuring the TCP link having the same attribute information is established again.

Figure 7:
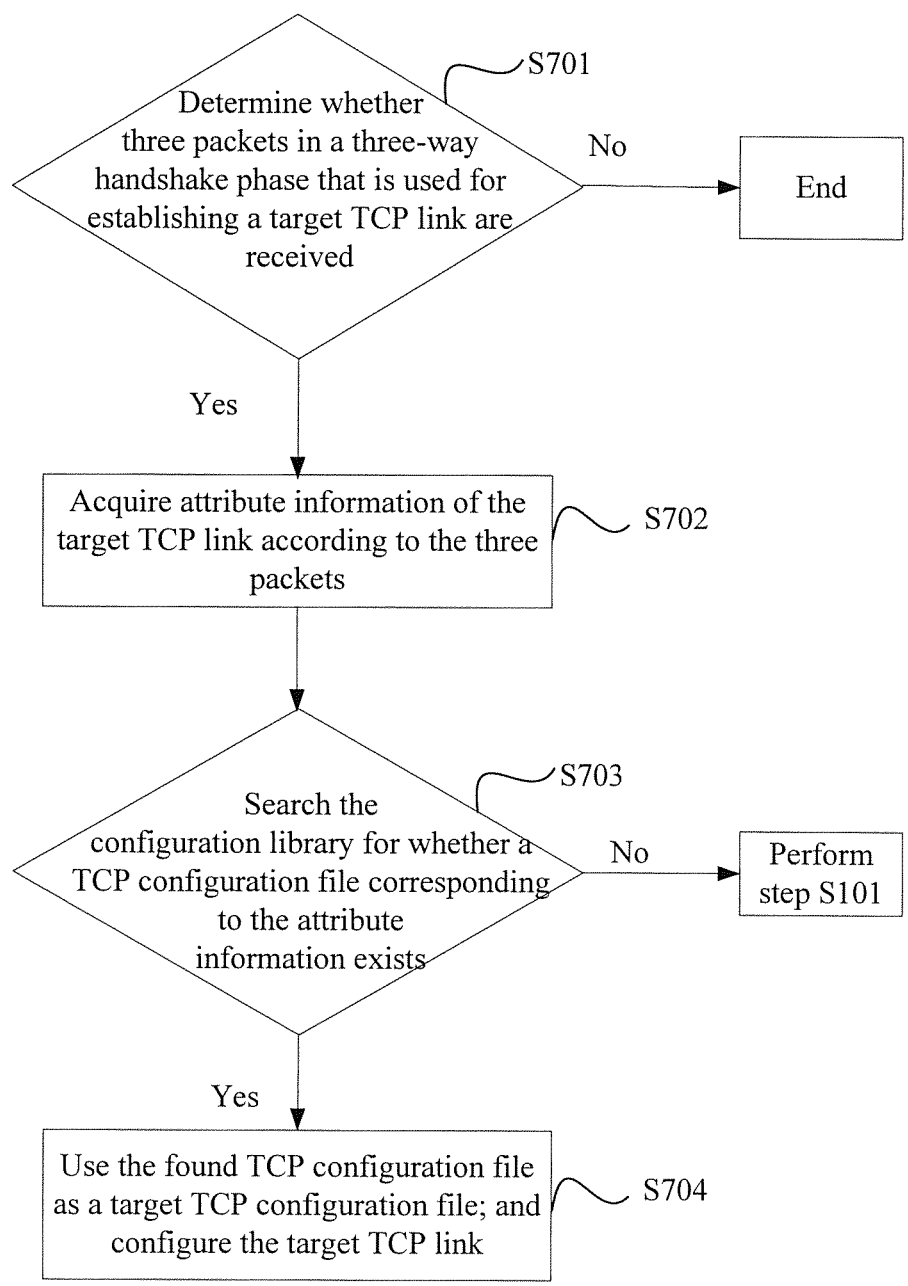
FIG. 7 is a schematic flowchart of a TCP link configuration method according to yet another embodiment of the present invention.

FIG. 7 is a schematic flowchart of a TCP configuration method according to yet another embodiment of the present invention. Based on the embodiment shown in the foregoing FIG. 6, when a configuration library stores a correspondence between attribute information of a target TCP link and a target TCP configuration file, as shown in FIG. 7, the method may further include the following steps:

S701. Determine whether three packets in a three-way handshake phase that is used for establishing the target TCP link are received.

The packets, in the three-handshake phase that is used for establishing the target TCP link, received herein refer to packets in a three-way handshake phase when the target TCP link is established again after the target TCP link is configured by using a solution recorded in the foregoing embodiments. When the three packets are received, perform step S602; otherwise, the procedure ends.

S702. Acquire attribute information of the target TCP link according to the three packets.

S703. Search the configuration library for whether a TCP configuration file corresponding to the attribute information exists.

When the TCP configuration file corresponding to the attribute information exists, perform step S704; otherwise, perform step S101.

S704. Use the found TCP configuration file as a target TCP configuration file; and configure the target TCP link.

According to the method provided in this embodiment of the present invention, a correspondence between TCP attribute information and a TCP configuration file may be pre-established; in this way, in a link establishment phase of a target TCP link, a target TCP configuration file corresponding to the target TCP link can be rapidly determined by searching for attribute information carried in packets of a three-way handshake for establishing a link.

For the multiple method embodiments shown in the foregoing FIG. 1b, FIG. 2, FIG. 3, FIG. 4, FIG. 5a, FIG. 5b, FIG. 6, and FIG. 7, mutual reference may be made to same steps among different method embodiments; different steps among different method embodiments may also be mutually combined; technical solutions formed after the combination shall fall within the protection scope of the embodiments of the present invention.

Based on the foregoing descriptions of the method embodiments, a person skilled in the art may clearly understand that the present invention may be implemented by software in addition to necessary universal hardware platform or by hardware only. In most circumstances, the former is a preferred implementation manner. Based on such an understanding, the technical solutions of the present invention essentially or the part contributing to the prior art may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a read-only memory (ROM), a random access memory (RAN), a magnetic disk, or an optical disc.

Embodiments of the present invention further provide an apparatus and a device for implementing the foregoing method embodiments. The following describes the apparatus and the device with examples.

Figure 8:
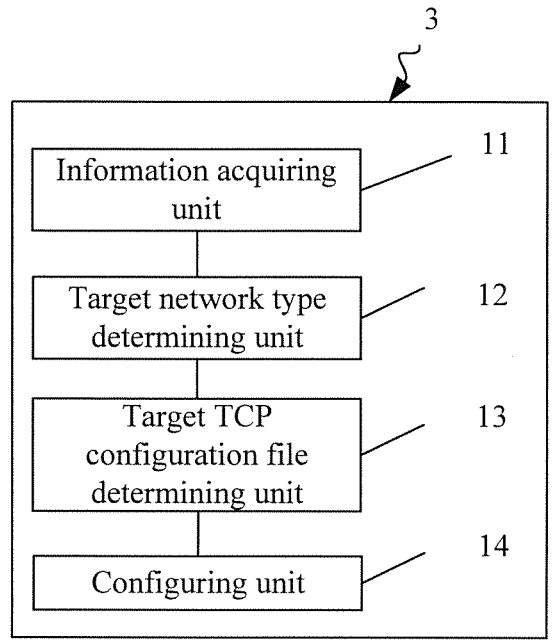
FIG. 8 is a schematic structural diagram of a TCP link configuration apparatus according to an embodiment of the present invention.

Based on the foregoing method embodiments, an embodiment of the present invention further provides a TCP link configuration apparatus. As shown in FIG. 8, 3 is the TCP link configuration apparatus. The apparatus may include an information acquiring unit 11, a target network type determining unit 12, a target TCP configuration file determining unit 13, and a configuring unit 14, where:

the information acquiring unit 11 is configured to acquire data information in a data packet transmitted on a target TCP link or transmission information generated in a process of transmitting the data packet;

the target network type determining unit 12 is configured to determine, according to the data information or the transmission information, a target network type of a network on which the target TCP link is located, where the data information includes a destination IP address and a source IP address that are carried in the data packet transmitted on the target TCP link, and a second transmission information includes: throughput, a variation in a round-trip transmission time, a latency peak value, a maximum round-trip transmission time, a quantity of lost data packets, and/or a retransmission rate;

the searched target TCP configuration file determining unit 13 is configured to search a pre-established configuration library for a target TCP configuration file corresponding to the target network type, where the configuration library includes a correspondence between a network type and a TCP configuration file, and each network type corresponds to one TCP configuration file; and the configuring unit 14 is configured to configure the target TCP link by using the searched target TCP configuration file.

It may be learned from the foregoing technical solutions that, according to the apparatus provided in this embodiment of the present invention, by detecting data information transmitted on a target TCP link or a transmission information, a target network type of a network on which the target TCP link is located can be determined; further, a pre-established configuration library can be searched for a target TCP configuration file corresponding to the target network type; and finally, the target TCP link is configured by using the searched target TCP configuration file. Therefore, according to the apparatus, a matched TCP configuration file can be found and configuration can be performed according to a condition of data packet transmission on the target TCP link.

Compared with the prior art, according to the apparatus, the configured target TCP link is better adapted to a network type to which the target TCP link belongs; use of network bandwidth can be maximized; and TCP transmission efficiency is improved.

When the data information includes the destination IP address and the source IP address that are carried in the data packet transmitted on the target TCP link, the target network type determining unit 12 may include:

a first judging unit, configured to determine whether the destination IP address or the source IP address is an IP address of a server that runs a TCP service; and a first determining unit, configured to determine that the target network type is a local area network when the destination IP address is the IP address of the server that runs the TCP service or determine that the target network type is a wide area network when the source IP address is the IP address of the server that runs the TCP service.

When the transmission information includes a round-trip transmission time for transmitting the data packet on the target TCP link, the target network type determining unit 12 may include:

a round-trip transmission time judging unit, configured to determine whether the round-trip transmission time is less than a first preset length of time; and a second determining unit, configured to determine that the target network type is a local area network when the round-trip transmission time is less than the first preset length of time or determine that the target network type is a wide area network when the round-trip transmission time is greater than or equal to the first preset length of time.

Figure 9:
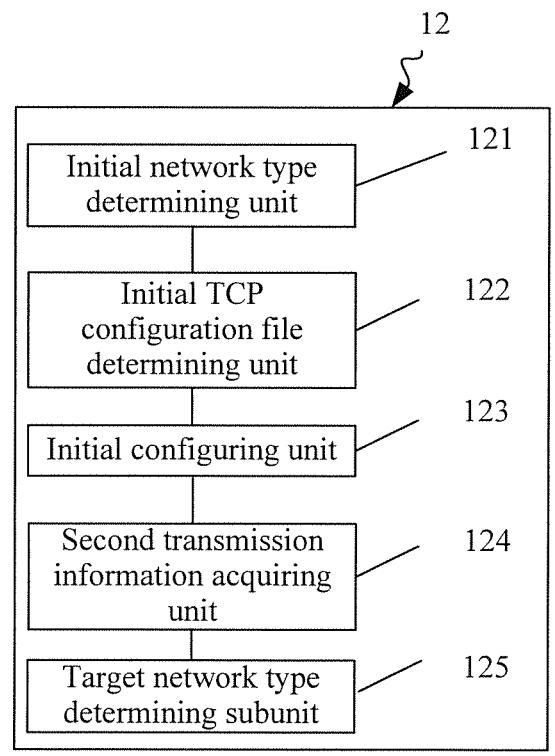
FIG. 9 is a schematic structural diagram of a target network type determining unit according to an embodiment of the present invention.

In another embodiment of the present invention, as shown in FIG. 9, the target network type determining unit 12 may include:

an initial network type determining unit 121, configured to determine, according to the data information or the transmission information, an initial network type corresponding to the target TCP link, where the initial network type includes the target network type;

an initial TCP configuration file determining unit 122, configured to search for an initial TCP configuration file corresponding to the initial network type;

an initial configuration unit 123, configured to perform initial configuration on the target TCP link by using the initial TCP configuration file;

a second transmission information acquiring unit 124, configured to acquire second transmission information generated in a process of transmitting the data packet on the initially configured target TCP link; and a target network type determining subunit 125, configured to determine, according to the second transmission information, the target network type of the network on which the target TCP link is located.

When the second transmission information includes throughput, a variation in a round-trip transmission time, a latency peak value, a maximum round-trip transmission time, a quantity of lost data packets, and/or a retransmission rate, the target network type determining subunit 125 may include:

a third determining unit, configured to: determine that the target network type is a wireless network when the throughput is less than a first preset throughput, there is no variation in the round-trip transmission time before congestion occurs, no latency peak value is detected, and the round-trip transmission time is not less than a second preset length of time; or determine that the target network type is a wireless network when the throughput is less than a second preset throughput, the maximum round-trip transmission time is less than a third preset length of time, loss of multiple data packets has not occurred within a round-trip transmission time, and the retransmission rate is less than a preset retransmission rate.

Figure 10:
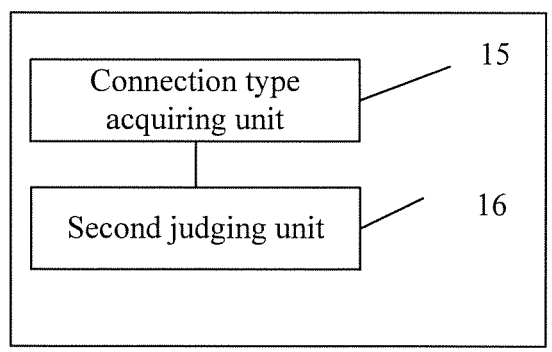
FIG. 10 is another schematic structural diagram of a target network type determining unit according to an embodiment of the present invention.

Instill another embodiment of the present invention, as shown in FIG. 10, the apparatus 3 may further include:

a connection type acquiring unit 15, configured to acquire a connection type of the initially configured target TCP link; and a second judging unit 16, configured to: determine whether the connection type is an http short connection;

and/or, determine whether the number of data packets transmitted on the initially configured target TCP link after congestion occurs is less than a preset number; and/or, determine whether a transmission rate of the data packet transmitted on the initially configured target TCP link after congestion occurs is less than a preset transmission rate; and/or, determine whether the connection type is a long connection and whether the number of times congestion occurs on the target TCP link is less than a preset value; where the target network type determining subunit 125 performs the operation of determining, according to the second transmission information, the target network type of the network on which the target TCP link is located when the connection type is an http short connection, or the number of data packets transmitted after congestion occurs is less than the preset number, or the transmission rate is less than the preset transmission rate, or the connection type is a long connection and the number of times congestion occurs is less than the preset value.

In addition, in this embodiment of the present invention, when any one of determining results of the second judging unit 16 is no, the target network type determining subunit 125 is further configured to determine that the initial network type is the target network type; and the searched target TCP configuration file determining unit 13 is further configured to use the initial TCP configuration file as the searched target TCP configuration file.

By means of determining in two steps, the finally determined target network type can be more accurate, so that the configured target TCP link is better adapted to a network type to which the target TCP link belongs, use of network bandwidth can be maximized, and TCP transmission efficiency is improved.

Figure 11:
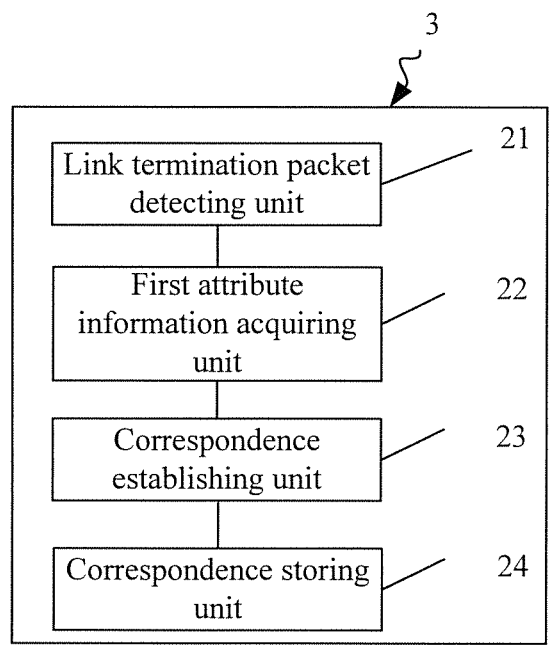
FIG. 11 is a schematic structural diagram of a TCP link configuration apparatus according to another embodiment of the present invention.

In yet another embodiment of the present invention, as shown in FIG. 11, the apparatus may further include:

a link termination packet detecting unit 21, configured to determine whether a first packet in a four-way handshake phase that is used for terminating the target TCP link is received;

a first attribute information acquiring unit 22, configured to acquire attribute information of the target TCP link when the first packet is received, where the attribute information includes access port information or IP address information;

a correspondence establishing unit 23, configured to establish a correspondence between the attribute information and the searched target TCP configuration file; and a correspondence storing unit 24, configured to store the correspondence between the attribute information and the searched target TCP configuration file in the configuration library.

In this embodiment of the present invention, in each link termination phase of the target TCP link, the correspondence between attribute information of the target TCP link and a target TCP configuration file is stored in the configuration library, so that, subsequently, a TCP link can be directly configured by using configuration information of the TCP link.

Figure 12:
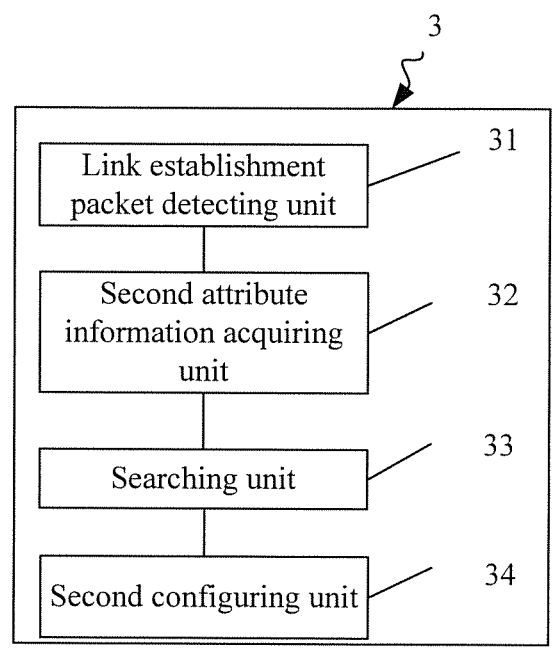
FIG. 12 is a schematic structural diagram of a TCP link configuration apparatus according to still another embodiment of the present invention.

In yet another embodiment of the present invention, as shown in FIG. 12, the apparatus may further include:

a link establishment packet detecting unit 31, configured to determine whether three packets in a three-way handshake phase that is used for establishing the target TCP link are received;

a second attribute information acquiring unit 32, configured to acquire attribute information of the target TCP link according to the three packets when the three packets are received, where the attribute information includes access port information or IP address information;

a searching unit 33, configured to search the configuration library for whether a TCP configuration file corresponding to the attribute information exists; and a second configuring unit 34, configured to, when the TCP configuration file corresponding to the attribute information exists, use the found TCP configuration file as the searched target TCP configuration file and configure the target TCP link.

When the TCP configuration file corresponding to the attribute information does not exist, the information acquiring unit 11 performs an operation.

According to the apparatus provided in this embodiment of the present invention, a correspondence between TCP attribute information and a TCP configuration file may be pre-established; in this way, in a link establishment phase of a target TCP link, a target TCP configuration file corresponding to the target TCP link can be rapidly determined by searching for attribute information carried in packets of a three-way handshake for establishing a link.

The embodiments of the present invention further provide a TCP link control device. The device may include the TCP link configuration apparatus described in any one of the embodiments of FIG. 8 to FIG. 12.

Figure 13:
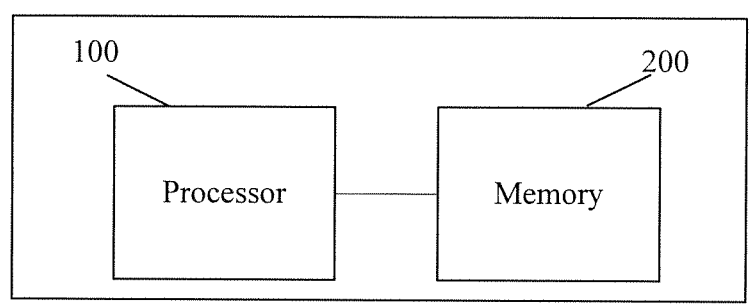
FIG. 13 is a schematic structural diagram of a TCP link control device according to an embodiment of the present invention.

FIG. 13 is a schematic structural diagram of a TCP link control device according to an embodiment of the present invention. As shown in FIG. 13, the device may include a processor 100 and a memory 200.

The processor 100 is configured to execute the following programs:

acquiring data information in a data packet transmitted on a target TCP link or transmission information generated in a process of transmitting the data packet;

determining, according to the data information or the transmission information, a target network type of a network on which the target TCP link is located;

searching a pre-established configuration library for a target TCP configuration file corresponding to the target network type, where the configuration library includes a correspondence between a network type and a TCP configuration file, and each network type corresponds to one TCP configuration file; and configuring the target TCP link by using the searched target TCP configuration file.

In addition, the processor 100 is further configured to execute programs corresponding to steps shown in any one of the embodiments of the foregoing FIG. 1b to FIG. 7.

The memory 200 is configured to store the configuration library and stores determining conditions for various determining executed by the processor 100.

It is understandable that this invention may be applicable to environments or configurations of many universal or dedicated computing systems. For example, a personal computer, a server computer, a handheld device or a portable device, a flat panel device, a multi-processor system, a microprocessor-based system, a set-top box, a network PC, a minicomputer, a mainframe computer, and a distributed computing environment including any one of the above system or device.

The present invention can be described in the general context of executable computer instructions executed by a computer, for example, a program module. Generally, the program unit includes a routine, program, target, component, data structure, and the like for executing a particular task or implementing a particular abstract data type. The present invention may also be practiced in distributed computing environments where tasks are performed by remote processing devices that are connected through a communication network. In a distributed computing environment, program modules may be located in both local and remote computer storage media including storage devices.

It should be noted that the relational terms herein such as first and second are used only to differentiate an entity or operation from another entity or operation, and do not require or imply any actual relationship or sequence between these entities or operations. Moreover, the terms "includes", "includes", or any other variation thereof are intended to cover a non-exclusive inclusion, so that a process, a method, an article, or a device that includes a series of elements is not necessarily limited only to those elements, but may include other elements not expressly listed or inherent to such process, method, article, or device. An element proceeded by "at least one . . . " does not, without more constraints, preclude the existence of additional identical elements in the process, method, article, or device that includes the element.

The foregoing descriptions are merely specific implementation manners of the present invention. It should be noted that a person of ordinary skill in the art may make certain improvements or polishing without departing from the principle of the present invention and the improvements or polishing shall fall within the protection scope of the present invention.

What is claimed is:

1. A Transmission Control Protocol (TCP) link configuration method, comprising:
    acquiring data information in a data packet transmitted on a target TCP link or transmission information generated in a process of transmitting the data packet;
    determining, according to the data information or the transmission information, a target network type of a network on which the target TCP link is located;
    searching a pre-established configuration library for a target TCP configuration file corresponding to the target network type, wherein the configuration library comprises a correspondence between a network type and a TCP configuration file, and each network type corresponds to one TCP configuration file; and
    configuring the target TCP link by using the searched target TCP configuration file, including configuring at least a congestion control algorithm, a size of a receiving buffer, and a size of a sending buffer for the target TCP link according to the network type corresponding to the searched target TCP confirmation file.

2. The method according to claim 1, wherein:
    the data information comprises: a destination IP address and a source IP address that are carried in the data packet transmitted on the target TCP link; and
    determining, according to the data information, the target network type of the network on which the target TCP link is located comprises:
        determining whether the destination IP address or the source IP address is an IP address of a server that runs a TCP service,
        determining that the target network type is a local area network when the destination IP address is the IP address of the server that runs the TCP service, or
        determining that the target network type is a wide area network when the source IP address is the IP address of the server that runs the TCP service.

3. The method according to claim 1, wherein:
    the transmission information comprises a round-trip transmission time for transmitting the data packet on the target TCP link; and
    determining, according to the transmission information, the target network type of the network on which the target TCP link is located comprises:
        determining whether the round-trip transmission time is less than a first preset length of time,
        determining that the target network type is a local area network when the round-trip transmission time is less than the first preset length of time, or
        determining that the target network type is a wide area network when the round-trip transmission time is greater than or equal to the first preset length of time.

4. The method according to claim 1, wherein determining, according to the data information or the transmission information, the target network type of the network on which the target TCP link is located comprises:
    determining, according to the data information or the transmission information, an initial network type of the network on which the target TCP link is located;
    searching the configuration library for an initial TCP configuration file corresponding to the initial network type;
    performing initial configuration on the target TCP link by using the initial TCP configuration file;
    acquiring second transmission information generated in a process of transmitting the data packet on the initially configured target TCP link; and
    determining, according to the second transmission information, the target network type of the network on which the target TCP link is located.

5. The method according to claim 4, wherein:
    the second transmission information comprises at least one of: throughput, a variation in a round-trip transmission time, a latency peak value, a maximum round-trip transmission time, a quantity of lost data packets, and/or a retransmission rate; and
    determining, according to the second transmission information, the target network type of the network on which the target TCP link is located comprises:
        determining that the target network type is a wireless network when the throughput is less than a first preset throughput, there is no variation in the round-trip transmission time before congestion occurs, no latency peak value is detected, and the round-trip transmission time is not less than a second preset length of time, or
        determining that the target network type is a wireless network when the throughput is less than a second preset throughput, the maximum round-trip transmission time is less than a third preset length of time, loss of multiple data packets has not occurred within a round-trip transmission time, and the retransmission rate is less than a preset retransmission rate.

6. The method according to claim 4, wherein after acquiring second transmission information generated in a process of transmitting the data packet on the initially configured target TCP link, the method further comprises:
    acquiring a connection type of the initially configured target TCP link;
    determining whether the connection type is an http short connection; and/or, determining whether the number of data packets transmitted on the initially configured target TCP link after congestion occurs is less than a preset number; and/or, determining whether a transmission rate of the data packet transmitted on the initially configured target TCP link after congestion occurs is less than a preset transmission rate; and/or, determining whether the connection type is a long connection and whether the number of times congestion occurs on the target TCP link is less than a preset value; and performing the step of determining, according to the second transmission information, the target network type of the network on which the target TCP link is located when the connection type is an http short connection, or the number of data packets transmitted after congestion occurs is less than the preset number, or the transmission rate is less than the preset transmission rate, or the connection type is a long connection and the number of times congestion occurs is less than the preset value.

7. The method according to any one of claim 1, wherein the method further comprises:

determining whether a first packet in a four-way handshake phase that is used for terminating the target TCP link is received;

acquiring attribute information of the target TCP link when the first packet in the four-way handshake phase that is used for terminating the target TCP link is received, wherein the attribute information comprises an access port or an IP address; and establishing a correspondence between the attribute information and the searched target TCP configuration file, and storing the correspondence between the attribute information and the searched target TCP configuration file in the configuration library.

8. The method according to claim 7, wherein the method further comprises:

determining whether three packets in a three-way handshake phase that is used for establishing the target TCP link are received;

acquiring attribute information that is of the target TCP link and carried in the three packets when the three packets in the three-way handshake phase that is used for establishing the target TCP link are received;

searching the configuration library for whether a TCP configuration file corresponding to the attribute information exists; and configuring the target TCP link by using the found TCP configuration file when the TCP configuration file corresponding to the attribute information exists.

9. A Transmission Control Protocol (TCP) link configuration apparatus for use in a communications network having a user terminal and a server respectively disposed on two sides of the communications network, wherein a TCP link is established between the user terminal and the server by using the communications network, wherein the apparatus is disposed in a network device of the communications network or disposed in the server and is configured to configure the TCP link, the apparatus comprising:

a memory; and a processor in communication with the memory, wherein the processor is configured to:

acquire data information in a data packet transmitted on a target TCP link or transmission information generated in a process of transmitting the data packet;

determine, according to the data information or the transmission information, a target network type of a network on which the target TCP link is located;

search a pre-established configuration library for a target TCP configuration file corresponding to the target network type, wherein the configuration library comprises a correspondence between a network type and a TCP configuration file, and each network type corresponds to one TCP configuration file; and configure the target TCP link by using the searched target TCP configuration file, including configure at least a congestion control algorithm, a size of a receiving buffer, and a size of a sending buffer for the target TCP link according to the network type corresponding to the searched target TCP confirmation file.

10. The apparatus according to claim 9, wherein:

the data information comprises a destination IP address and a source IP address that are carried in the data packet transmitted on the target TCP link; and the processor is further configured to:

determine whether the destination IP address or the source IP address is an IP address of a server that runs a TCP service, and determine that the target network type is a local area network when the destination IP address is the IP address of the server that runs the TCP service or determine that the target network type is a wide area network when the source IP address is the IP address of the server that runs the TCP service.

11. The apparatus according to claim 9, wherein:

the transmission information comprises a round-trip transmission time for transmitting the data packet on the target TCP link; and the processor is further configured to:

determine whether the round-trip transmission time is less than a first preset length of time, and determine that the target network type is a local area network when the round-trip transmission time is less than the first preset length of time or determine that the target network type is a wide area network when the round-trip transmission time is greater than or equal to the first preset length of time.

12. The apparatus according to claim 9, wherein the processor is further configured to:

determine, according to the data information or the transmission information, an initial network type of a network on which the target TCP link is located;

search the configuration library for an initial TCP configuration file corresponding to the initial network type;

perform initial configuration on the target TCP link by using the initial TCP configuration file;

acquire second transmission information generated in a process of transmitting the data packet on the initially configured target TCP link; and determine, according to the second transmission information, the target network type of the network on which the target TCP link is located.

13. The apparatus according to claim 12, wherein:

the second transmission information comprises at least one of: throughput, a variation in the round-trip transmission time, a latency peak value, a maximum round-trip transmission time, a quantity of lost data packets, and/or a retransmission rate; and the processor is further configured to:

determine that the target network type is a wireless network when the throughput is less than a first preset throughput, there is no variation in the round-trip transmission time before congestion occurs, no latency peak value is detected, and the round-trip transmission time is not less than a second preset length of time, or determine that the target network type is a wireless network when the throughput is less than a second preset throughput, the maximum round-trip transmission time is less than a third preset length of time, loss of multiple data packets has not occurred within a round-trip transmission time, and the retransmission rate is less than a preset retransmission rate.

14. The apparatus according to claim 9, wherein the processor is further configured to:
    acquire a connection type of the initially configured target TCP link; and
    determine whether the connection type is an http short connection; and/or, determine whether the number of data packets transmitted on the initially configured target TCP link after congestion occurs is less than a preset number; and/or, determine whether a transmission rate of the data packet transmitted on the initially configured target TCP link after congestion occurs is less than a preset transmission rate; and/or
    determine whether the connection type is a long connection and whether the number of times congestion occurs on the target TCP link is less than a preset value; and
    perform an operation when the connection type is an http short connection, or the number of data packets transmitted after congestion occurs is less than the preset number, or the transmission rate is less than the preset transmission rate, or the connection type is a long connection and the number of times congestion occurs is less than the preset value.

15. The apparatus according to claim 14, wherein the processor is further configured to:
    determine whether a first packet in a four-way handshake phase that is used for terminating the target TCP link is received;
    acquire attribute information of the target TCP link when the first packet in the four-way handshake phase that is used for terminating the target TCP link is received, wherein the attribute information comprises an access port or an IP address; and
    establish a correspondence between the attribute information and the searched target TCP configuration file, and store the correspondence between the attribute information and the searched target TCP configuration file in the configuration library.

16. The apparatus according to claim 15, wherein the processor is further configured to:
    determine whether three packets in a three-way handshake phase that is used for establishing the target TCP link are received;
    acquire attribute information that is of the target TCP link and carried in the three packets when the three packets in the three-way handshake phase that is used for establishing the target TCP link are received;
    search the configuration library for whether a TCP configuration file corresponding to the attribute information exists; and
    configure the target TCP link by using the found TCP configuration file when the TCP configuration file corresponding to the attribute information exists.

17. A Transmission Control Protocol (TCP) link control device, comprising:
    a memory configured to store a configuration library; and
    a processor in communication with the memory, wherein the processor is configured to:
        acquire data information in a data packet transmitted on a target TCP link or transmission information generated in a process of transmitting the data packet;
        determine, according to the data information or the transmission information, a target network type of a network on which the target TCP link is located;
        search the configuration library for a target TCP configuration file corresponding to the target network type, where the configuration library includes a correspondence between a network type and a TCP configuration file, and each network type corresponds to one TCP configuration file; and
        configure the target TCP link by using the target TCP configuration file, including configure at least a congestion control algorithm, a size of a receiving buffer, and a size of a sending buffer for the target TCP link according to the network type corresponding to the target TCP confirmation file.

* * * * *